(12) United States Patent
Speier

(10) Patent No.: US 6,859,033 B2
(45) Date of Patent: Feb. 22, 2005

(54) METHOD FOR MAGNETIC RESONANCE FLUID CHARACTERIZATION

(75) Inventor: Peter Speier, Erlangen (DE)

(73) Assignee: Schlumberger Technology Corporation, Sugar Land, TX (US)

( * ) Notice: Subject to any disclaimer, the term of this patent is extended or adjusted under 35 U.S.C. 154(b) by 100 days.

(21) Appl. No.: 10/064,914

(22) Filed: Aug. 28, 2002

(65) Prior Publication Data

US 2004/0041562 A1 Mar. 4, 2004

(51) Int. Cl.$^7$ ................................................. G01V 3/00
(52) U.S. Cl. ........................................ 324/303; 324/306
(58) Field of Search .............................. 324/303, 300, 324/306, 307, 309, 312, 314

(56) References Cited

U.S. PATENT DOCUMENTS

| | | | |
|---|---|---|---|
| 5,486,762 A | | 1/1996 | Freedman et al. |
| 6,107,796 A | * | 8/2000 | Prammer .................. 324/303 |
| 6,121,774 A | | 9/2000 | Sun et al. |
| 6,166,543 A | | 12/2000 | Sezginer et al. |
| 6,229,308 B1 | | 5/2001 | Freedman |
| 6,232,778 B1 | | 5/2001 | Speier et al. |
| 6,255,818 B1 | | 7/2001 | Heaton et al. |
| 6,331,775 B1 | | 12/2001 | Thern et al. |
| 6,400,147 B1 | | 6/2002 | Toufaily et al. |
| 6,400,148 B1 | | 6/2002 | Meyer et al. |
| 6,459,992 B1 | | 10/2002 | Freedman et al. |
| 6,498,484 B1 | | 12/2002 | Sun et al. |
| 6,518,757 B1 | | 2/2003 | Speier |
| 6,522,137 B1 | | 2/2003 | Sun et al. |
| 6,522,138 B2 | | 2/2003 | Heaton |
| 6,534,980 B2 | | 3/2003 | Toufaily et al. |
| 6,559,638 B1 | | 5/2003 | Adelerhof |
| 6,573,716 B2 | | 6/2003 | Toufaily et al. |
| 6,646,437 B1 | * | 11/2003 | Chitale et al. ............... 324/303 |
| 6,661,226 B1 | * | 12/2003 | Hou et al. ................... 324/303 |

* cited by examiner

Primary Examiner—Louis Arana
(74) Attorney, Agent, or Firm—Kevin P. McEnaney; Brigitte L. Echols; John Ryberg

(57) ABSTRACT

A method for determining properties of a mixture of fluids includes: (a) acquiring a plurality of nuclear magnetic resonance measurements from the mixture of fluids, each of the plurality of nuclear magnetic resonance measurements having a different value in an acquisition parameter for which at least one relaxation selected from the group consisting of longitudinal relaxation and transverse relaxation affects magnitudes of the nuclear magnetic resonance measurements; (b) generating a model of the mixture of fluids; (c) calculating a synthesized nuclear magnetic data set based on the model; (d) comparing the synthesized nuclear magnetic data set with the nuclear magnetic resonance measurements; and (e) adjusting the model and repeating (c) and (d), if difference between the synthesized nuclear magnetic data set and the nuclear magnetic measurements is greater than a minimum.

25 Claims, 5 Drawing Sheets

METHOD FOR MAGNETIC RESONANCE FLUID CHARACTERIZATION

BACKGROUND OF INVENTION

The invention relates generally to the field of well logging. More particularly, the invention relates to improved techniques for well logging using nuclear magnetic resonance and methods for analyzing the nuclear magnetic measurements.

Oil well logging tools include nuclear magnetic resonance (NMR) instruments. NMR instruments can provide a wealth of information for formation evaluation that is not obtainable from other well logging measurements. Information provided by NMR measurements include the fractional volume of pore space, the fractional volume of mobile fluid filling the pore space, and the porosity of earth formations. General background of NMR well logging is described in U.S. Pat. No. 6,140,817A1, assigned to the assignee hereof.

The signals measured by nuclear magnetic resonance (NMR) logging tools typically arise from the selected nuclei present in the probed volume. Because hydrogen nuclei are the most abundant and easily detectable, most NMR logging tools are tuned to detect hydrogen resonance signals (form either water or hydrocarbons). These hydrogen nuclei have different dynamic properties (e.g., diffusion rate and rotation rate) that are dependent on their environments. The different dynamic properties of these nuclei manifest themselves in different nuclear spin relaxation times (i.e., spin-lattice relaxation time ($T_1$) and spin-spin relaxation time ($T_2$)) and diffusion constants. For example, hydrogen nuclei in viscous oils have relatively short relaxation times and low diffusivity, whereas hydrogen nuclei in light oils possess relatively long relaxation times and high diffusivity. Furthermore, the hydrogen nuclei in free water typically have longer relaxation times than those in bound water. Consequently, these differing NMR relaxation times can provide information on properties of the earth formations.

Most NMR logging tools measure the spin-spin relaxation times ($T_2$) to derive the properties of the earth formations. $T_2$ relaxation is often measured from a train of spin-echoes that are generated with a series of pulses such as the Carr-Purcell-Meiboom-Gill (CPMG) pulse sequence or some variants of this. The CPMG pulse sequence is well known in the art. See Meiboom, S., Gill, D., 1958, "Modified Spin Echo Method for Measuring Nuclear Relaxation Times," Review of Scientific Instruments, 29, 688–91.

Although $T_2$ measurements provide useful information for formation characterization, $T_2$ information alone may not be sufficient for distinct characterization of earth formations, especially when different components in the formations have similar or overlapping $T_2$ values. In order to differentiate different fluids (e.g., hydrocarbons versus connate water) with similar or overlapping $T_2$ distributions, several differential methods have been proposed, such as the differential spectrum method (DSM) and time domain analysis (TDA). These methods takes advantages of different longitudinal relaxation times of different fluids. Two sets of measurements are made with different wait times (times for the spin to be polarized by the static magnetic field). One wait time is selected that one type of fluid (e.g., brine that has a longer longitudinal relaxation time $T_1$) would not fully relax. As a result, the signal magnitudes from the long $T_1$ fluid would be substantially reduced. Subtraction of these two sets of measurements would then produce a difference measurement which is comprised mostly of signals from the fluids with long $T_1$ times. However, success of these approaches relies on the selection of proper wait times, which requires prior knowledge of the NMR properties of the fluids in the formation.

Recently, a magnetic resonance fluid characterization (MRF) method has been shown to provide more useful information. For a detailed discussion of the MRF method, see U.S. Pat. No. 6,229,308 B1 issued to Freedman and assigned to the assignee of the present invention. This patent is hereby incorporated by reference. When $T_2$ distributions overlap, the MRF method distinguishes oil and water in porous media based on different molecular diffusion. For the same $T_2$, oil and water have different diffusion constants. Therefore, contributions of different fluids to the measured $T_2$ distributions can be separated by combining measurements with different sensitivity to diffusion. However, in order to use MRF, diffusion constants must be measurable. If $T_2$ becomes comparable with or shorter than the decay due to diffusion, then the diffusion constant can no longer be determined, and the MRF method becomes impracticable. In other words, the MRF method is applicable only when $T_2$ values are longer than a certain critical value.

While the MRF analysis has proved to be a powerful approach, it is desirable to have methods that can be used to analyze fluids with not only long $T_1$ or $T_2$, but also short $T_1$ or $T_2$, such as viscous fluids. Furthermore, it is desirable to have methods that can be used in logging tools with a low magnetic field gradient or a saddle point in the magnetic field.

SUMMARY OF INVENTION

One aspect of the invention relates to methods for determining properties of a mixture of fluids using NMR data that include longitudinal and transverse relaxation information. According to embodiments of the invention, a method for determining properties of a mixture of fluids includes: (a) acquiring a plurality of nuclear magnetic resonance measurements from the mixture of fluids, each of the plurality of nuclear magnetic resonance measurements having a different value in an acquisition parameter for which at least one relaxation selected from the group consisting of longitudinal relaxation and transverse relaxation affects magnitudes of the nuclear magnetic resonance measurements; (b) generating a model of the mixture of fluids; (c) calculating a synthesized nuclear magnetic data set based on the model; (d) comparing the synthesized nuclear magnetic data set with the nuclear magnetic resonance measurements; and (e) adjusting the model and repeating (c) and (d), if difference between the synthesized nuclear magnetic data set and the nuclear magnetic measurements is greater than a minimum.

Another aspect of the invention relates to methods for logging an earth formation surrounding a wellbore. According to embodiments of the invention, a method for logging an earth formation surrounding a wellbore includes: (a) lowering a nuclear magnetic resonance instrument into the wellbore; (b) inducing a static magnetic field in a region of investigation; (c) generating a series of radio frequency magnetic field pulses in the region of investigation, and receiving signals comprising a train of nuclear magnetic resonance spin echoes in response to the series of radio frequency magnetic field pulses, wherein the generating and the receiving are repeated a plurality of times each with a different value in an acquisition parameter for which at least one of the longitudinal relaxation and transverse relaxation affects magnitudes of the signals; (d) generating a formation model that includes at least one component for a connate water phase and at least one component for an oil phase; (e) calculating a synthesized nuclear magnetic data set based on the formation model; (f) comparing the synthesized nuclear magnetic data set with the nuclear magnetic resonance measurements; and (h) adjusting the formation model and repeating (c) and (d), if difference between the synthesized nuclear magnetic data set and the nuclear magnetic measurements is greater than a minimum.

Other aspects and advantages of the invention will be apparent from the following description and the appended claims.

DETAILED DESCRIPTION

Figure 1:
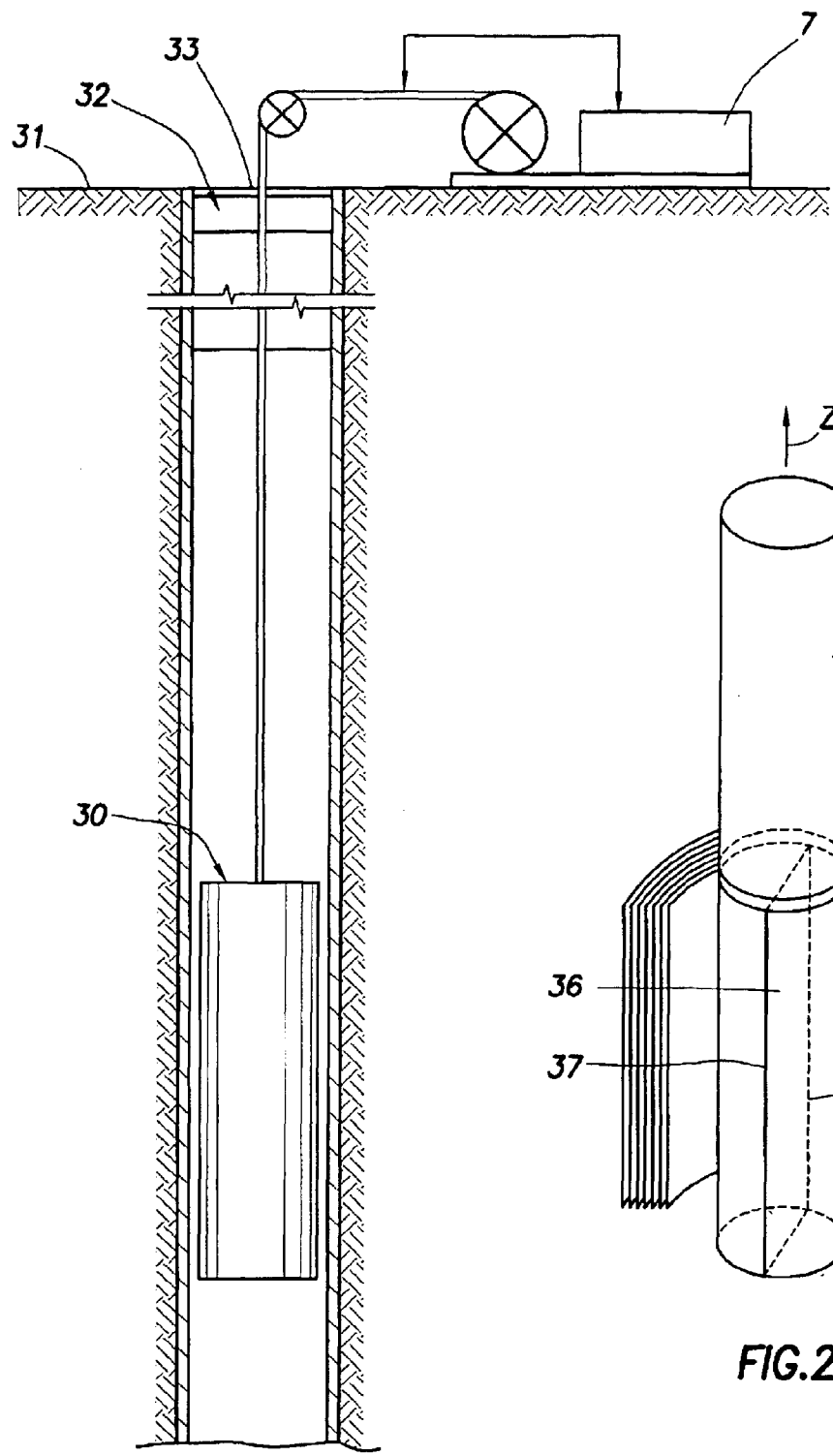
FIG. 1 is a diagram of a typical setup for well logging.

FIG. 1 shows a schematic of a nuclear magnetic resonance (NMR) logging tool 30 for investigating earth formations 37 traversed by a borehole 32. The NMR logging tool 30 is suspended in the borehole 32 on an armored cable 33, the length of which substantially determines the relative depth of the logging tool 30. The cable length is controlled by suitable means at the surface such as a drum and winch mechanism 8. Surface equipment 7 may include a processor subsystem to communicate with downhole equipment including NMR logging tool 30.

The NMR logging tool 30 can be any suitable nuclear magnetic resonance logging device. It may be one adapted for in wireline logging applications as shown in FIG. 1, or one that can be used in logging while drilling (LWD) applications. The NMR logging tool 30 typically includes a means for producing a static magnetic field in the formations, at least one radio frequency (RF) antenna, and means for producing pulses of RF power to induce RF magnetic fields in the formations and for receiving the spin echoes from the formations. The means for producing a static magnetic field may comprise a permanent magnet or magnet array, and the RF antenna may comprise one or more RF antennas, which may be solenoid antennas, loop antennas, or saddle antennas.

Figure 2:
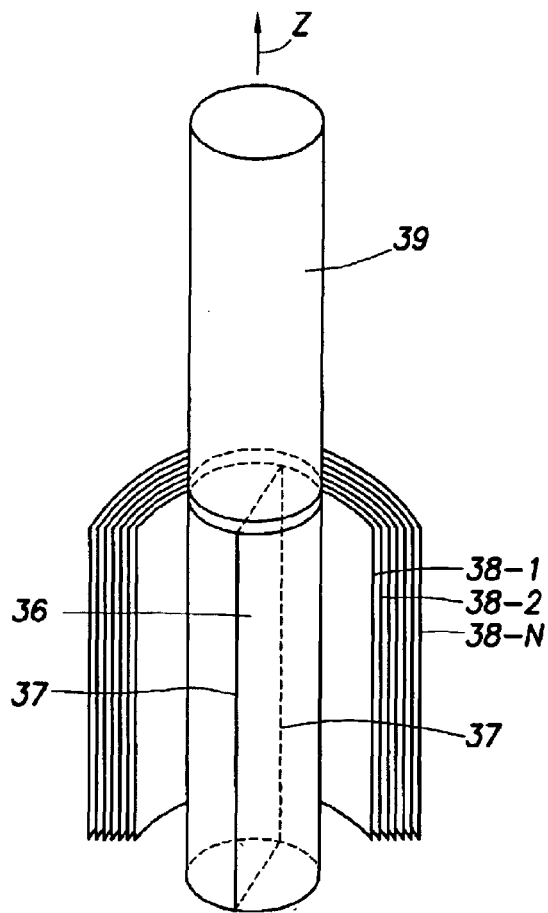
FIG. 2 shows a diagram of a prior art NMR logging tool.

A schematic representation of some of the components of an NMR logging tool 30 is illustrated in FIG. 2, which shows a first centralized magnet or magnet array 36 and an RF antenna 37, which may be a suitably oriented coil or coils. FIG. 2 also illustrates a general representation of closely-spaced cylindrical thin shells, 38-1, 38-2 ... 38-N, that can be frequency selected in a multi-frequency logging operation. These thin shells are resonance regions where magnet 36 has a radial gradient in the field amplitude. One such device is disclosed in U.S. Pat. No. 4,710,713 issued to Strikman. In FIG. 2, another magnet or magnet array 39 is shown. Magnet array 39 may be used to pre-polarize the earth formation ahead of the investigation region as the logging device 30 is raised in the borehole in the direction of arrow Z. Examples of NMR logging tools having pre-polarization magnet arrays are disclosed in U.S. Pat. Nos. 5,055,788 and 3,597,681.

Figure 3:
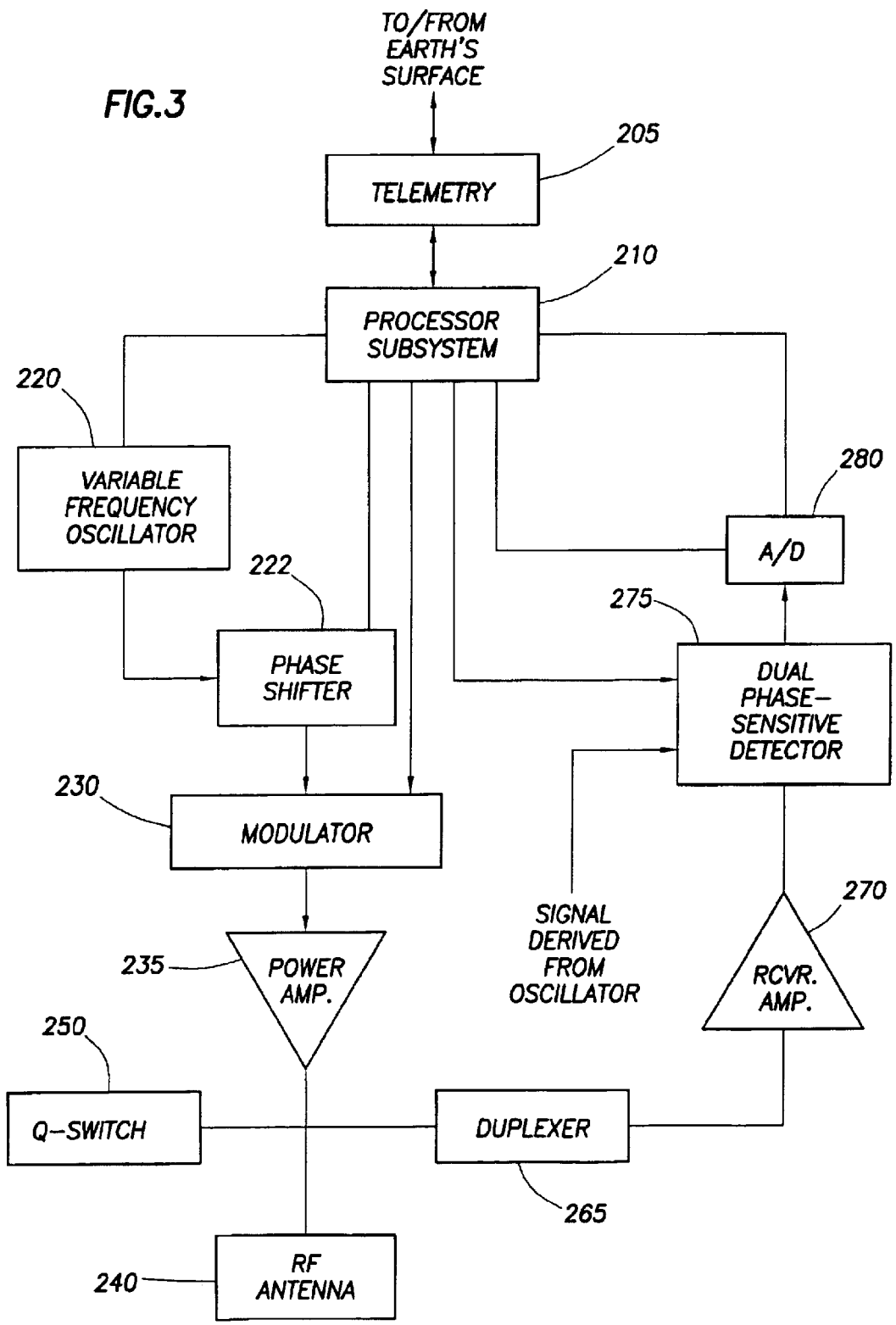
FIG. 3 is a block diagram of circuitry for producing the RF pulses and receiving the spin echoes.

FIG. 3 illustrates a schematic of a circuitry of an NMR tool for producing the RF pulses and for receiving and storing the spin echoes. One skilled in the art would appreciate that any other suitable circuitry could be used without departing from the scope of the invention. In FIG. 3, a downhole processor 210 has associated memory, timing, interfaces, and peripherals (not separately shown), as known in the art. The processor subsystem 210 is coupled with telemetry circuitry 205, for communication with a processor (not shown) at the earth's surface. The pulse forming circuitry includes a variable frequency oscillator 220 which, under control of processor 210, produces radio frequency (RF) signals at the desired frequencies. The output of oscillator 220 is coupled to a phase shifter 222, which permits control of pulse phases, and then to a modulator 230, both of which are under the control of processor subsystem 210. The phase shifter 222 and modulator 230 can be controlled, in a manner known in the art, to produce the desired pulse phases of RF field. The output of modulator 230 is coupled, via a power amplifier 235, to the RF antenna 240. A Q-switch 250 can be provided to damp the RF antenna system to reduce antenna ringing. The antenna 240 is also coupled with a receiver section via duplexer 265, the output of which is coupled to receiver amplifier 270. The duplexer 265 protects the receiver amplifier 270 from the high power pulses which pass to the RF antenna 240 during the transmitting and damping modes. During the receiving mode, the duplexer 265 acts as a low impedance connection from antenna 240 to the receiver amplifier 270. The output of receiver amplifier 270 is coupled to a dual phase-sensitive detector 275, which also receives, as a reference, a signal derived from the oscillator signal. The detected output is coupled to analog-to-digital converter 280, the output of which is a digital version of the received nuclear magnetic resonance signal. Although the logging device or tool 30 is shown as a single body in FIG. 1, it may alternatively comprise separate components, and the tool may be combinable with other logging tools. Also, while a wireline is illustrated, alternative forms of physical support and communicating link can be used, for example in a measurement while drilling system.

Several NMR parameters may be measured that can be used to derive formation properties. Most NMR logging operations measure the spin-lattice (longitudinal) relaxation times ($T_1$) and/or spin-spin (transverse) relaxation times ($T_2$) of hydrogen nuclei. In addition, some NMR logging tools may provide a ratio of $T_1/T_2$ directly, and other NMR tools may provide diffusion constants (D).

Various pulse sequences are known in the art for measuring the NMR relaxation times. For example, $T_1$ (longitudinal) relaxation may be measured using an inversion-recovery (IR), saturation recovery (SR), or steady-state approach, or any of their derivatives. $T_2$ relaxation is often measured from a train of spin-echoes that are generated with a series of pulses such as the Carr-Purcell-Meiboom-Gill (CPMG) pulse sequence or some variant of this. The CPMG pulse sequence is well known in the art. See Meiboom, S., Gill, D., 1958, "Modified Spin Echo Method for Measuring Nuclear Relaxation Times," Review of Scientific Instruments, 29, 688–91. CPMG pulse sequence generates a train of spin echoes, whose amplitudes exponentially decay as a function of time. The exponential decay life time is referred to as a transverse (spin-spin) relaxation time, $T_2$. Thus, $T_2$ measurements are accomplished by analyzing the amplitudes of spin echoes thus obtained.

NMR measurements of diffusion constants are accomplished in the presence of magnetic field gradients. Magnetic field gradients produce different strengths of magnetic field at different locations. The different magnetic field strengths manifest themselves as different Larmor frequencies in the detected signals (because $\omega_o = \gamma B_o$). If a delay time is inserted between the pulse and the start of signal collection, nuclear spins can diffuse from location A to location B, i.e., from one Larmor frequency to another, with a concomitant loss of phase coherence. This results in a decrease in the magnitudes of the detected signals. The diffusion induced decay of the NMR signal depends on the square of the echo spacing and on the magnetic field gradient, because the decay rate is governed by:

$$\left(\frac{1}{T_{1,Diff}}\right) = \frac{1}{12} D(\gamma G)^2 t_d^2,$$

where D is the diffusion constant, G is the gradient of the static magnetic field, y is the gyromagnetic ratio, and $t_e$ is the echo spacing. See, e.g., C. P. Slichter, Principles of Magnetic Resonance, 3$^{rd}$ Edition, Springer Verlag, Berlin, Heidelberg, N.Y., 1990, chapter 8 and appendix G.

Once NMR data, which include information on $T_1$, $T_2$ relaxation times, $T_1/T_2$ ratio, or diffusion rates D, are collected, they are analyzed with an inversion method to derive a model of the earth formations. For the derived model, properties of the formation then can be calculated. Many methods are known in the art for inverting NMR data, including the Window Processing (WP) method disclosed in U.S. Pat. No. 5,291,137 issued to Freedman. However, when different fluids have similar NMR parameters, for example, same or overlapping $T_2$ distributions, most inversion methods cannot separately characterize these fluids.

Freedman et al. disclosed a magnetic resonance fluid (MRF) characterization method that is capable of distinguishing different fluids even if they have overlapping NMR parameters (e.g., overlapping $T_2$ distributions). See Freedman et al., "*A New Method of Fluid Characterization in Reservoir Rocks: Experimental Confirmation and Simulation Results*," Paper SPE 63214 presented at the 2000 Society of Petroleum Engineers Annual Technical Conference and Exhibition, and Freedman et al., "*Field Applications of a New Nuclear Magnetic Resonance Fluid Characterization Method*," paper SPE 71713 presented at the 2001 Society of Petroleum Engineers Annual Technical Conference and Exhibition. In addition, U.S. Pat. No. 6,229,308 B1 issued to Freedman discloses the application of this method in formation evaluation.

The MRF method is based on two key concepts: (1) a new microscopic CVM (constituent viscosity model) that relates NMR relaxation times and molecular diffusion coefficients in crude oils, and (2) a new multi-fluid relaxation model. The MRF method provides a detailed formation evaluation of the near wellbore region investigated by modern NMR logging tools. The information provided by MRF includes flushed-zone fluid saturations and volumes, total and bound-fluid porosities, bulk volumes of hydrocarbon saturations, oil viscosities, and hydrocarbon-corrected permeabilities.

CVM relates individual constituent diffusion-free relaxation times and diffusion coefficients to a distribution of constituent viscosities. The constituent viscosities are molecular variables that are analogous to the "friction coefficients" used in Langevin equation models of Brownian motion in viscous media. Before looking at the correlation between proton relaxation times and diffusion constants and the viscosity of a mixture, it is helpful to look at the simplest situation first, i.e., a pure liquid.

In pure liquids, Bloembergen et al. in "*Relaxation Effects in Nuclear Magnetic Resonance Absorption*," Physical Review (1948), 73, no. 7, pp. 679–712, showed that proton relaxation times (e.g., $T_2$) depend on the temperature and the liquid viscosity according to:

$$T_2 = aT/\eta_o,$$

where a is a constant, $T_2$ is the spin-spin (transverse) relaxation time, T is the temperature of the liquid in degrees Kelvin, and $\eta_o$ is the viscosity of the liquid. This relationship is also valid for $T_1$, provided that the "fast motion" condition, $\omega_{oT} < 1$, is satisfied, where $\tau$ is a rotational (i.e., molecular tumbling) correlation time and $\omega_o$ is the Larmor frequency. In pure liquids, the relationship between diffusion constants and viscosities is described by the Einstein-Stokes model, which predicts that diffusivity is related to temperature and viscosity according to the equation: $D = kT/6\Pi\eta R$, where k is the Boltzmann constant, R is the radius of the spherical particle, $\eta$ is the viscosity of the fluid, and T is the temperature in degrees Kelvin. This relationship may be simplified as $D = bT/\eta$, where $b = k/6\Pi R$.

The dynamic properties of each individual constituent in a mixture are similar to those of a pure liquid. Thus, a similar relationship exists between the relaxation time ($T_{2o,k}$) and the diffusion constant ($D_{o,k}$) of the k-th constituent in a mixture of oils according to CVM. The subscripts "o,k" denotes the parameter is for the k-th constituent in the oils. The key CVM equations for a hydrocarbon mixture with n components are:

$$T_{2o,k} = \frac{aT}{\eta_k f(GOR)} \quad (1)$$

$$D_{o,k} = \frac{bT}{\eta_k} \quad (2)$$

$$\eta_o = \eta_1^{j1} * \eta_2^{j2} * \ldots * \eta_n^{jn} \equiv (\eta_k)_{kn} \quad (3)$$

where $T_{2o,k}$ and $D_{o,k}$ are the relaxation time and the diffusion coefficient, respectively, for the k-th molecular constituent in a hydrocarbon mixture (e.g., a crude oil), T is the sample temperature in degrees Kelvin, f(GOR), as will be explained below, is an empirically determined "universal function" of gas/oil ratio (GOR) and is $\geq 1$, a and b are constants, $\eta_k$ is the constituent viscosity for the k-th molecular constituent, $f_k$ is the proton fraction of each of the mixture constituents, and $\eta_o$ is the macroscopic viscosity ($\eta_o$) of the mixture. Equation (3) indicates that the macroscopic viscosity of the mixture equals the logarithmic mean (or geometric mean) of the constituent viscosity distribution (($\eta_k)_{LM}$).

The factor f(GOR) is included in equation (1) because it has been shown that GOR is an important parameter in determining the relaxation time dependence on viscosity and temperature. See Lo et al., *Relaxation Time And Diffusion Measurements of Methane And N-Decane Mixtures*, The Log Analyst, pp. 43–46, November-December, 1998; see also U.S. Pat. No. 6,229,308 B1. Note that the f(GOR) function is always equal or greater than 1. For dead oils (which are oils having no solution gas) and mixtures that do not contain any solution gas, f(GOR)=f(0)=1. (Freedman, R., et al., "*A New Method of Fluid Characterization in Reservoir Rocks: Experimental Confirmation and Simula-* tion Results," paper SPE 63214 presented at the 2000 SPE Annual Technical Conference and Exhibition, Dallas, 1–4 October; hereafter referred to as "Freedman et al."). The constant a in equation (1) has been empirically determined to be about 0.004 s·cp·K$^{-1}$ and this value has been shown to be applicable to substantially every constituent in crude oils. See Freedman et al. The constant b in equation (2) has been empirically determined to be about 5.05×10$^{-8}$ cm$^2$·s$^{-1}$·cp·K$^{-1}$. This value for constant b is also universally applicable to constituents in both dead and live hydrocarbon mixtures and crude oil. See Freedman et al.

Combining equations (1) and (2) provides the expression:

$$D_{o,k} = \frac{bT_{2o,k}}{a} f(GOR) \tag{4}$$

Equation (4) indicates that there is a linear relationship between the diffusion constant ($D_{o,k}$) and relaxation time ($T_{2o,k}$) for each of the constituents in the mixture. This linear relationship is similar to the relationship described above for the pure liquids. Furthermore, CVM should converge with a pure liquid model when there is only one constituent in the mixture (i.e., pure liquid, $n_o$=k=1). Indeed, when $n_o$=1, equations (1) and (2) reduce to a form identical to that for pure liquids as described by Bloembergen et al.

$$\left(T_2 = \frac{aT}{\eta_o f(GOR)} = \frac{aT}{\eta_o}, \text{ if } f(GOR) = 1\right)$$

and Stokes Einstein model $$D = \frac{bT}{\eta_o}$$

The validity of equations (1)–(4) has been shown (as disclosed in Freedman et al.) using experimental measurements of $T_2$ and D distributions on live and dead hydrocarbon mixtures and crude oils. Equations (1) and (2) provide some interesting insights into the nature of the molecular interactions in hydrocarbon mixtures such as crude oils. First, each molecular constituent retains its separate properties in the mixture. Second, the relationships between NMR relaxation times, molecular diffusion coefficients, and constituent viscosities for each constituent in a mixture are the same as that for a pure liquid, except that the constituent viscosity rather than the pure fluid viscosity (macro viscosity) determines the relaxation time and the diffusion coefficient of each constituent. Third, all unknown factors that might affect molecular interactions, e.g., molecular composition and molecular sizes, are contained in the constituent viscosity terms in this model, and there is no need to determine these factors. In addition, equation (4) predicts that the $T_2$ and D distributions in hydrocarbon mixtures and crude oils are not independent.

The importance of the CVM for fluid characterization can be appreciated from equation (4), which correlates diffusion-free relaxation times with molecular diffusion in crude oils. This link reduces the number of unknown parameters in the NMR multifluid relaxation model and results in robust and accurate recovery of oil $T_2$ and D distributions using the MRF method, even when the oil and connate water (or brine) $T_2$ distributions are broad and largely overlap one another.

The MRF method uses a general relaxation model for a formation containing brine, hydrocarbons, and oil-based mud filtrate (OBMF). Mud having hydrocarbons as the continuous phase is commonly used in drilling the borehole and it invades porous formations as OBMF. In the absence of magnetic field gradient or diffusion, the amplitudes of the spin echoes in NMR measurements decay exponentially as a function of time ($T_1$ or $T_2$). In the presence of a magnetic field gradient, molecular diffusion also contributes to the reduction of the measured NMR signal amplitudes. Let $$A_j^p$$

represent the amplitude of the j-th echo acquired during measurement p. Consider the following general relaxation model, $$A_j^p = \sum_{i=1}^{W_e} a_i \exp\left(-\frac{j*TE_p}{T_{2,i}^+(p)}\right)\left(1 - \exp\left(-\frac{W_p}{\xi * T_{2,1}}\right)\right) + \tag{5}$$

$$\sum_{k=1}^{W_e} b_k \exp\left(-\frac{j*TE_p}{T_{2,o}^+(\eta_k, p)}\right)\left(1 - \exp\left(-\frac{W_p}{T_{1,o}(\eta_k)}\right)\right) +$$

$$A_{OBMF} \exp\left(-\frac{j*TE_p}{T_{1,OBMF}^+(p)}\right)\left(1 - \exp\left(-\frac{W_p}{T_{1,OMBF}}\right)\right)$$

where the first, second, and third terms are connate water, native hydrocarbon, and OBMF signals, respectively. This three-phase model explicitly accounts for contributions from individual constituents in the connate water and hydrocarbon phases, but only assumes an average relaxation time distribution in the OBMF phase. The simplified term for OBMF is justified because experimental measurements in OBMF have shown that NMR relaxation time distributions for individual constituents in typical OBMF are very narrow and can be described by a single decay exponent. If such simplification is not desirable, one may include a summation function, like that for connate water or native hydrocarbon, for the OBMF. In addition, one skilled in the art would appreciate that this general relaxation model may be modified, for example, to remove the OBMF term, if justified (e.g., investigation of core samples removed from formations, or LWD-NMR logs in which mud infiltration is negligible), or to include gas in the fluids as disclosed in Appendix A of U.S. Pat. No. 6,229,308 B1.

The apparent transverse (spin-spin) relaxations ($T_2$) in any of the three phases modeled in equation (5) include actual transverse relaxation and signal decay due to self diffusion of molecules in the static magnetic field gradient $G_p$. For unrestricted diffusion in a uniform magnetic field gradient in the connate water, the apparent transverse relaxation rates can be written as, $$\frac{1}{T_{2,i}^+(p)} = \frac{1}{T_{2,i}} + \frac{(\gamma_H * G_p * TE_p)^2}{12} D_w(T) \tag{6}$$

Here, $T_{2,I}$ in the first term on the right-hand side are a set of relaxation times that represent the sum of surface and bulk relaxation of the connate water phase. The second term is the contribution to the relaxation rate from diffusion, where $$\gamma_H = 2\Pi * 4258 \text{ G}^{-1}\text{s}^{-1}$$

is the proton gyromagnetic ratio and $D_w(T)$ is the temperature dependent self diffusion coefficient of water in units of cm$^2$/s. Note that equation (6) assumes an unrestricted diffusion and a uniform magnetic field gradient $G_p$. One skilled in the art will appreciate that corrections to $D_w(T)$ for the effects of restricted diffusion and to $G_p$ for the effects of internal rock gradients can be applied if appropriate, such as when the formations have minerals having high magnetic susceptibility.

Similarly, the apparent transverse relaxation rates in the native oil $(T_{2,o}(\eta_k, p))$ can be written in the form, $$\frac{1}{T_{1o}(\eta_k, p)} = \frac{1}{T_{2,o}(\eta_k)} + \frac{(\gamma_H * G_p * TE_p)^2}{12} D_o(\eta_k) \qquad (7)$$

where $T_{2,o}(\eta_k)$ is the bulk relaxation time associated with amplitude $b_k$ in the hydrocarbon relaxation time distribution, and $D_o(\eta_k)$ is a viscosity dependent diffusion constant.

The measured viscosity ($\eta_o$) reflects a macroscopic transport property of the crude oil that determines its flow properties and is the quantity that is used in hydrodynamic transport equations like the Navier-Stokes equation. Morriss et al. showed that, for a suite of dead (i.e., not containing dissolved solution gas) crude oils, there exists a strong correlation between the logarithmic mean relaxation times of their constituents and the measured viscosities. See Morriss et al., "*Hydrocarbon Saturation And Viscosity Estimation From NMR Logging In The Belridge Diatomite,*" Paper C presented at the 35th Annual Meeting Of The Society Of Professional Well Logging Analysis, 1994. The macroscopic viscosity ($\eta_o$) of live crude oils is empirically related to the logarithmic mean $((\bar{T}_{2n})\ln)$ of the transverse relaxation time distributions by an equation of the form, $$\frac{1}{(\bar{T}_{2,o})_{dm}} = \frac{a\eta_o f(GOR)}{T} = c\eta_o \qquad (8)$$

where a is an empirically determined constituent constant that has been determined by Looyestijn ("*Determination of Oil Saturation From Diffusion NMR Logs,*" Paper SS presented at the 37$^{th}$ Annual meeting of the Society of Professional Well Log Analysts, 1996) to be around 250 (i.e., a≅250 Ks$^{-1}$cp$^{-1}$), for $(\bar{T}_{2n})\ln$ in seconds and $\eta_o$ in centipoise and T the temperature in degrees Kelvin. Thus, c=a/T in dead oil (no dissolved gas) or $$c \equiv \frac{a * f(GOR)}{T}$$

for live oil. The empirically derived function f(GOR) accounts for live oils (those containing dissolved solution gas) and has been discussed by Freedman et al. in paper number 63214 entitled "*A New NMR Method of Fluid Characterization in Reservoir Rocks: Experimental Confirmation and Simulation Results*" presented at the 2000 Society of Petroleum Engineers Annual Technical Conference and Exhibition meeting.

The $\eta_k$ terms in equation (7) are microscopic viscosities that reflect the complex composition of crude oils. Analogously with equation (8), the constituent viscosities are assumed to be related to the components in the relaxation time distribution via the same equation, $$\frac{1}{T_{2,o}(\eta_k)} = \frac{a\eta_k f(GOR)}{T} \equiv c\eta_k \qquad (9)$$

The dependence of the relaxation times on viscosity and temperature in equations (8) and (9) is consistent with the experimental observations and theoretical predictions of Bloembergen, Purcell, and Pound, *Relaxation Effects in Nuclear Magnetic Resonance Absorption*, Physical Review, vol. 73, no. 7, pp. 679–712, 1948.

Similar to the Stokes-Einstein equation, the self-diffusion constants for the crude oils, $D_o$, are assumed to have the same dependence on $T/\eta_k$. Therefore, for crude oils, $$D_o = \frac{bT}{\eta_o} \times 10^{-3} \qquad (10)$$

where b is a constant, $D_o$ is the measured crude oil diffusion constant in cm$^2$/s, and T is the temperature in degrees Kelvin. The empirical constant for crude oils, $b = 5.05 \times 10^{-3} \text{ cm}^2 s^{-1} cpK^{-1}$ is given by Freedman et al. in paper number 63214 entitled "*A New NMR Method of Fluid Characterization in Reservoir Rocks: Experimental Confirmation and Simulation Results,*" presented at the 2000 Society of Petroleum Engineers Annual Technical Conference and Exhibition meeting.

Analogously to the relationship between the macroscopic diffusion constant ($D_o$) and the macroscopic viscosity ($\eta_o$), the microscopic constituent diffusion constants ($D_o(\eta_k)$) of crude oil mixtures are related to the microscopic constituent viscosities ($\eta_k$) according to the following equation:

$$D_o(\eta_k) = \frac{bT}{\eta_k} \times 10^{-3} \qquad (11)$$

Equation (11) implies that there exists at the molecular level a distribution of diffusion constants in the crude oil mixture analogous to the distribution of relaxation times. This is the key concept of the CVM (constituent viscosity model). These distributions of diffusion constants and relaxation times can be derived from the measured NMR data by iteratively fitting a multifluid model as shown in equation (5) to these data using the method disclosed in U.S. Pat. No. 6,229,308 B1 issued to Freedman.

The MRF method inverts suites of NMR data using a multifluid relaxation model as shown in equation (5). In this model, different fluids that have overlapping $T_2$ distributions are distinguished based on differing diffusion constants. This is feasible because water molecules typically diffuse much faster than oil molecules, and much slower than gas molecules. Consequently, NMR diffusion measurements can provide a means for detection and differentiation of reservoir fluids, even if other NMR parameters cannot.

To use the contributions of differing molecular diffusion rates to resolve the fluid composition where there are overlapping $T_2$ distributions, the MRF method uses a suite of spin-echo measurements which have been acquired with different echo spacings, polarization times, applied magnetic field gradients, and/or numbers of echoes. The suite of NMR data may be acquired with a conventional CPMG-pulse sequence or a new type of "diffusion-editing"("DE") spin-echo sequence tailored for fluid typing. See M. D. Hürlimann et al., "*Diffusion-Editing: New NMR Measurement of Saturation and Pore Geometry,*" paper presented at the 2002 Annual Meeting of the Society of Professional Well Log Analysts, Osio, Japan, June 2–5; see also, U.S. application Ser. No. 09/723,803 filed on Nov. 28, 2000 by H ü rlimann, entitled "*Simpler and More Robust Hydrocarbon Typing with Pulsed NMR.*" This application is assigned to the assignee of the present invention and is hereby incorporated by reference. DE sequences are similar to the CPMG sequences except that the initial two echoes are acquired with longer echo spacings and the third and subsequent echoes are acquired with shorter echo spacings. Diffusion information is encoded during the acquisition of the first two echoes, whereas the third and subsequent echoes can provide bulk and surface relaxation time information with little, if any, attenuation of the signal by diffusion.

The suite of spin-echo measurements are then used in inversion analysis to fit the general multifluid relaxation model as shown in equation (5). Any inversion method known in the art may be used, including the Window Processing (WP) method disclosed in U.S. Pat. No. 5,291,137 issued to Freedman. This patent is assigned to the assignee of the present invention and is hereby incorporated by reference. For more detailed discussion of the MRF methods see Freedman et al., "*A New Method of fluid Characterization in Reservoir Rocks: Experimental Confirmation and Simulation Results,*" paper SPE 63214 presented at the 2000 SPE Annual Technical Conference and Exhibition, and Freedman et al., "*Field Applications of a New Nuclear Magnetic Resonance Fluid Characterization Method,*" paper SPE 71713 presented at the 2001 SPE Annual Technical Conference and Exhibition.

As stated above, for the diffusion constants to be measurable, the nuclear spin relaxing processes (longitudinal or transverse relaxation) should be slower than the diffusion process. Otherwise, the NMR signals would have diminished too much before any appreciable diffusion has occurred. In other words, if the NMR signal decays too quickly such that the decay becomes comparable with or faster than the signal decay due to the diffusion process, the diffusion constants can no longer be determined. Without the diffusion constants, the fluids with overlapping $T_2$ distributions cannot be separated by the conventional MRF method.

The lower limits of $T_1$ or $T_2$, above which the MRF method is useful, are even higher for logging-while-drilling (LWD-NMR™) tools because these tools typically have low magnetic field gradients. As is evident from the above discussion, the magnitudes of the diffusion-induced relaxation depend on the strengths of the magnetic field gradients. With low-gradient NMR tools (e.g., LWD-NMR™ or MRWD™), it requires longer delay times (e.g., the inter-echo delays) for the diffusion information to become detectable in the measurements. The required longer delay time makes the diffusion measurement only possible for fluids with relatively long $T_1$ or $T_2$ times. For example, a typical LWD-NMR tool operating at a gradient of 4 G/cm (Gauss per centimeter) would need about 6 times longer delays, as compared with a typical MRX™ tool operating at a gradient of 25 G/cm, for the molecular diffusion to be measurable. Thus, using a low-gradient NMR tool, the diffusion-based MRF method is useful only for oils with long $T_1$ or $T_2$ values, i.e., free fluids, but not for heavy oils.

Embodiments of the present invention are capable of extending the applicability of the MRF method to situations where short NMR relaxation times do not permit accurate determination of the diffusion constants. Embodiments of the invention use other characteristics of the fluids, for example, different $T_1/T_2$ ratios (ξ in equation (5)), to differentiate fluids having similar or overlapping $T_2$ distributions. $T_1/T_2$ ratios are readily measurable using typical NMR logging tools. $T_1/T_2$ contrasts (different $T_1/T_2$ ratios between different fluids) have been used in the art for other purposes, such as "polarization correction," which is important for measurements-acquired using pulse sequences that have short wait times (WT). See U.S. Pat. No. 6,229,308 B1, issued to Freedman.

In free fluids, $T_2$ equals $T_1$ except for very viscous fluids (e.g., tar) and/or for very high Larmor frequencies (usually not encountered in logging tools). Thus, in free fluids, the $T_1/T_2$ ratio equals 1. The porous spaces in the formations often are water wet. As a result, oils (hydrocarbons) are repelled from the surfaces (walls) of the pores, and they behave like free fluids without boundary effects. In contrast, water interacts with the surfaces of the rock grains. Consequently, each water molecule would spend some time as a surface-bound water molecule and other time as a free-water molecule. Surface-bound water molecules tend to have faster transverse (spin-spin) relaxation, i.e., short $T_2$, while free-water molecules would have longer $T_2$ values that approach the $T_1$ values. Therefore, on average, water molecules in the formations have shorter (average) $T_2$ values than those of free fluids, e.g., oils (hydrocarbons). Consequently, for fluids in the formations, there is a $T_1/T_2$ contrast between oil and water: $T_1/T_2$ (oil)≈1, and $T_1/T_2$ (water)>1, e.g., 1.5 3.0 in sandstones.

A $T_1/T_2$ contrast between oil and water of 1.5 does not seem large. However, this ratio appears as an exponent in an exponential function that describes the echo train amplitudes (see e.g., equation (5)). Consequently, $T_1/T_2$ contrast of 1.5 provides an easily detectable amplitude difference between two fluids with identical $T_2$ times.

Figure 4A:
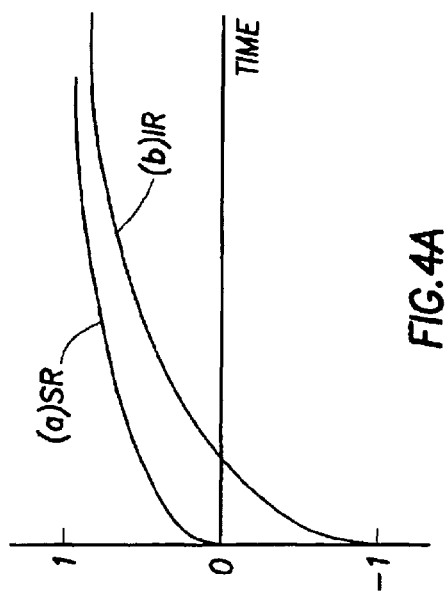
FIGS. 4A and 4B show the exponential recovery of signals after an inversion pulse or a saturation pulse.

The $T_1/T_2$ contrast can be exploited using several NMR methods, for example, saturation recovery (SR), inversion recovery (IR), or steady state method in combination with conventional CPMG pulse sequences. Among various methods for $T_1$ evaluation, IR (which monitors the growth of the signal magnitude from 1 to +1) has more dynamic range for signal detection than SR does (which monitors the growth of the signal magnitude from 0 to +1) (see FIG. 4A). In FIG. 4A, curve (a) depicts the exponential growth of an NMR signal magnitude after the saturation power has been turned off, and curve (b) depicts the exponential growth of an NMR signal magnitude after a 180-degree inversion pulse. It is apparent from FIG. 4A that curve (b) would provide at least two fold better sensitivity in monitoring the exponential growth than would curve (a). As a practical matter, the measurements cannot start immediately after a saturation pulse is turned off. A delay time is required for instrument circuitry to equilibrate before the detection can begin. This delay further degrades the sensitivity of the SR approach because most dramatic magnitude changes are lost during the delay time. For this reason, IR typically produces data that are about 3 fold better quality than those from SR. Therefore, the following discussion will use IR as an example. However, one skilled in the art would appreciate that the following discussion applies equally well to all other methods that can produce $T_1/T_2$ ratios, including SR.

Figure 5A:
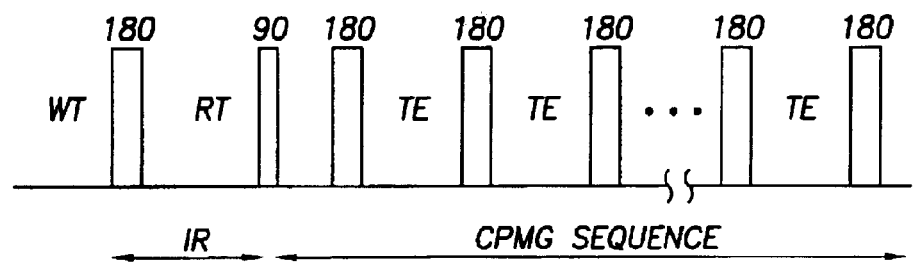
FIGS. 5A and 5B show the pulse sequences for IR-CPMG and SR-CPMG, respectively.

Using inversion recovery (IR) as an example, a pulse sequence for measuring the $T_1/T_2$ ratio would be: (WT 180 RT CPMG)$_n$, as illustrated in FIG. 5A, where WT is the wait time (also called "polarization time") for spins to relax back to the steady state, RT is the recovery delay time during which the signals exponentially grow back to the steady state magnitudes, and CPMG is the typical CPMG pulse train (i.e., a series of 180-degree pulses with a fixed delay time, TE, between them). This pulse sequence will be referred to as an "IR-CPMG" sequence.

Figure 5B:
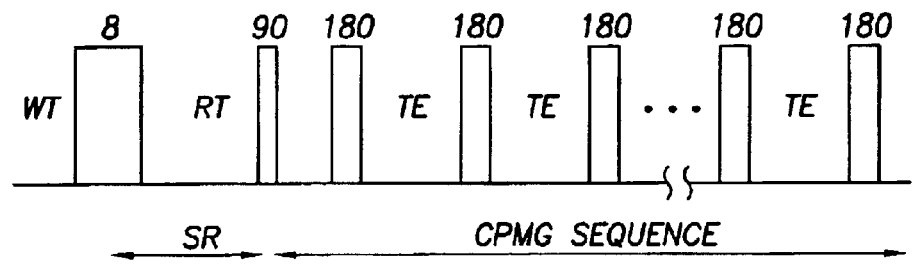

In FIG. 5A, the first 180-degree pulse inverts the magnetization (i.e., onto the Z axis). After RT delay the signal may be detected with a 90-degree pulse. As shown in FIG. 5A, the signals are actually detected with a CPMG sequence as a train of spin echoes. The detected spin echo magnitudes will be influenced not only by the $T_2$ relaxation process, but also the $T_1$ relaxation process, which is encoded by the various RT delay times. The IR-CPMG sequence as shown in FIG. 5A would detect signal components that have relaxed back to the Z axis after RT delay. Herein, the "IR-CPMG" would be used to refer to the sequence shown in FIG. 5A and any variant sequence which substantially include this sequence and achieve the same purpose. FIG. 5B shows a CPMG sequence coupled with a saturation recovery (SR) sequence, instead of an inversion recovery (IR) sequence. This sequence would be referred to as an "SR-CPMG" sequence. The SR-CPMG sequence as shown in FIG. 5B would detect signal components that have relaxed back to the Z axis after RT delay. As stated above, the SR-CPMG may be used instead of the IR-CPMG in the embodiments of the invention.

Ideally, WT in any pulse sequence should be long enough for all spins to relax back to the steady state (i.e., fully polarized by the static magnetic field) before the next pulse cycle. However, time economy often dictates that a shorter WT is used, which may result in incomplete magnetization being detected. If insufficient WT is used, polarization of the spins by the static magnetic field may not be complete. The detectable signal intensity under this condition is given by:

$$I = I_o(1 - e^{-RT/T_1}),$$

where $I_o$ denotes the detectable signal intensity when the spin is fully polarized by the static magnetic field (or fully relaxed back to the steady state).

The measured signal amplitude ($A_i$ for the i-th echo from the CPMG train) using an IR-CPMG sequence would be:

$$A_i = A(1 - S * e^{-RT/T_1})e^{-iTE/T_1} \quad (11)$$

where A is the full signal amplitude after full repolarization along the static magnetic field, RT is the inversion recovery time in the IR-CPMG sequence (see FIG. 5A), TE is the delay time between the 180-degree pulses in the CPMG sequence, $T_1$ and $T_2$ are the longitudinal and transverse relaxation times, respectively, and S is defined as:

$$S = 1 + IE * (1 - e^{-RT/T_1}).$$

where IE is the inversion efficiency. The inversion efficiency, IE, is 1.0 under ideal condition. However, IE is around 0.8 for a typical well logging tool.

The above formulation assumes that signal decay due to diffusion is negligible, and the measured spin echoes decay with true $T_2$. In addition to the $T_2$ decay during the CPMG pulse train, the measured spin echo magnitudes are also influenced by the RT delay times in the IR-CPMG sequence ($T_1$ relaxation). Alternatively, if RT is kept constant, the signal magnitudes would be influenced by $T_2$ relaxation.

Figure 4B:
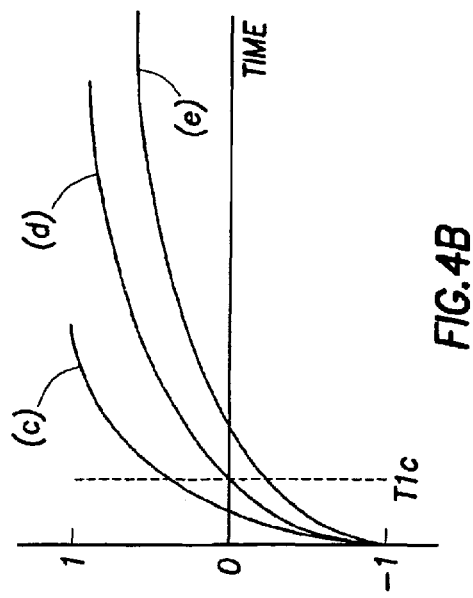

Referring to curve (b) in FIG. 4A, it is apparent that there exists a critical RT, for which the recovering signal would vanish and become undetectable (i.e., $A_t=0$). This RT occurs at where curve (b) intercepts the time axis in FIG. 4A. Because different fluids have different $T_1$ values, each fluid may have a different RT time when the signal would become undetectable. Referring now to FIG. 4B, if a fixed RT delay time, e.g., $T_{1c}$, is used in the IR-CPMG sequence, some signals would have recovered sufficiently to produce a positive signal magnitude (curve (c)), some might become undetectable (curve (d)), and some may produce a negative magnitude (curve (e)).

According to equation (11), $A_t=0$ when $T_{1c}=RT/\ln(S)$. Thus, $T_{1c}=RT/0.59$ for S=0.8, or $T_{1c}=RT/0.69$ for S=1.0. Signal components with $T_1<T_{1c}$ (curve (c) in FIG. 4B) will appear with $A_t>0$, and signal components with $T_1>T_{1c}$ (curve (e) in FIG. 4B) will appear with $A_t<0$, while signal components with $T_1=T_{1c}$ (curve (d) in FIG. 4B) will be undetectable.

FIG. 4B illustrates the node where $A_t=0$ in $T_1$ measurement. This node can also be located using the first echoes in the CPMG measurements using the IR-CPMG sequence shown in FIG. 5A having different RT delay times. In well logging, a train of CPMG echoes are typically recorded for each RT delay. The node in the measured data where the intensity is zero will depend not only on $T_1$ but also on $T_2$. Therefore, the position of this node (where $A_t=0$) in the $T_2$ spectrum is determined by the $T_1/T_2$ ratio. By recording echo trains for several RT, it is possible to invert the data for two components with two $T_1/T_2$ ratios in the neighborhood of this node. The simplest measurement suite would consist of two measurements: one with a standard burst CPMG without the inversion recovery sequence and the other with an IR-CPMG with RT<WT.

For data inversion, if the $T_1/T_2$ ratio for water is known, inversion routines, such as the Window Processing method as disclosed in U.S. Pat. No. 5,291,137 issued to Freedman, for normal CPMG data suites may be used. Only the data model for the experimental data has been changed to that described above. Data inversion would yield $T_2$ distributions for oil and water directly. From these $T_2$ distributions, porosity fractions (water-filled porosity, oil-filled porosity, and total NMR porosity), volume fractions (bound fluid volume and free fluid volume), constituent oil viscosities, viscosity or diffusion constants of the oil mixture or brine, and permeabilities can then be calculated. Methods for deriving formation properties from the $T_2$ distribution are known in the art. For example, U.S. Pat. No. 6,229,308 B1 provides details on how this might be achieved.

Figure 6:
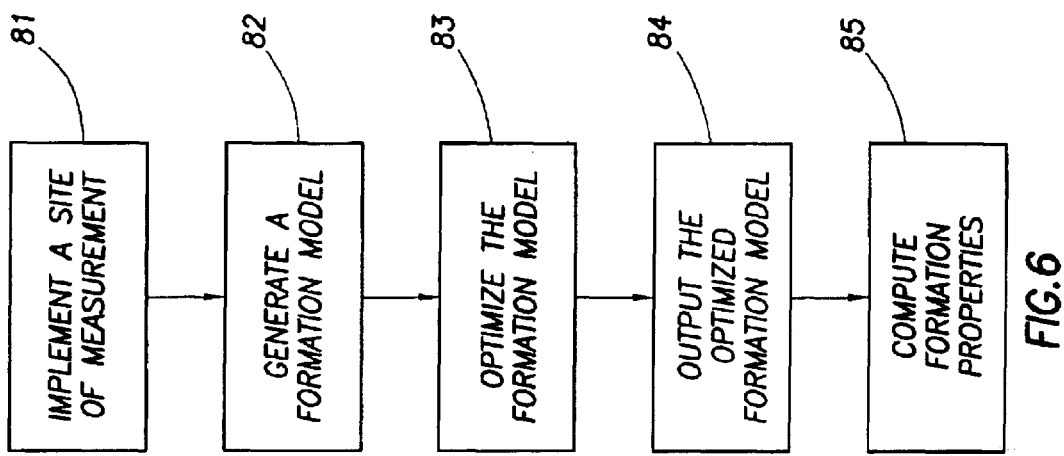
FIG. 6 shows a flow chart of a method according to one embodiment of the invention.

FIG. 6 illustrates key elements in the embodiments of the present invention. First, a suite of (i.e., a plurality of sets of) NMR measurements are acquired (shown at 81) with at least one parameter selected from wait time or polarization time (WT), recovery time (RT), inter-echo delay time (TE), and number of echoes (NE) varied between different sets of measurements, wherein each set of measurements includes information on the longitudinal ($T_1$) and transverse ($T_2$) relaxation process. For example, the measurements may be acquired with the IR-CPMG or SR-CPMG sequence (as shown in FIGS. 5A and 5B), or any variation of these sequences so long as the collected data include information on both $T_1$ and $T_2$. The parameter is preferably so varied that the $T_1$ and/or $T_2$ process affects each NMR data set to a different extent. The sets of NMR data may be acquired with any NMR logging tool, wireline or logging-while-drilling. In addition, these measurements may be made with core samples removed from the formations in the laboratory.

Once NMR data are collected, a formation model is generated (shown at 82) for inversion analysis. This model may include oils, brine, OBMF, and/or gas. In addition, within each fluid type (e.g., oils), the model may include multiple components to account for the constituents in the mixture. The model may include estimated signal magnitude, longitudinal relaxation time, transverse relaxation time, ratio of longitudinal to transverse relaxation time, diffusion constant, and viscosity for each constituent. This model is then optimized (shown at 83) to fit the collected data. The optimization process typically includes calculating a synthesized NMR data set based on the model; comparing the synthesized NMR data set with the NMR measurements; and adjusting the model and repeating the calculating and comparing processes, if the difference between the synthesized NMR data set and the NMR measurements is greater than "a minimum." One skilled in the art would appreciate that "a minimum" for optimizing a formation model as used herein may be a true minimum of the difference between the calculated values and the experimental values. Alternatively, "a minimum" for the purpose of formation optimization may be a preset value, below which the difference between the model and the formations is considered acceptable. The optimization process may use any algorithm known in the art, for example Powell's nonlinear Constrained Minimization Algorithm cited in U.S. Pat. No. 6,229,308 B1, or Monte Carlo simulation.

The optimized formation model is then output (shown at 84) with the computed parameters for each constituent fluid. These parameters may include $T_1$ or $T_2$ relaxation time, diffusion constants, and constituent viscosity. From these constituent parameters, the desired formation properties can then be calculated (process 85). As stated above, the formation properties may include: porosity fractions (water-filled porosity, oil-dilled porosity, and total NMR porosity), volume fractions (bound fluid volume and free fluid volume), constituent oil viscosities, viscosity or diffusion constants of the oil mixture or brine, and permeabilities.

The utility of embodiments of the present invention will now be illustrated with the following examples, in which computations are performed with a software package such as that sold under the trade name of MatLab™ by The MathWorks, Natick, Mass.

First, two identical $T_2$ distributions for oil and water (representing the most difficult case to resolve) were created with $T_2$ values in the range from 2.5 to 25 ms. The oil filled porosity is 10 pu, the water-filled porosity is 20 pu. The $T_1/T_2$ ratio was set to 1.0 for the oil component and 1.5 for the water component. These distributions of $T_2$ were observed with 3 suites of 5 IR-CPMG or SR-CPMG and 1 CPMG sequences, having the following parameters:

| | | | | | | |
|---|---|---|---|---|---|---|
| Suite 1: Long WT IR Suite | | | | | | |
| IE | 0.8 | 0.8 | 0.8 | 0.8 | 0.8 | NA* |
| WT | 10,000 | 10,000 | 10,000 | 10,000 | 10,000 | 10,000 |
| RT | 1 | $\sqrt{10}$ | 10 | $\sqrt{100}$ | 100 | NA* |
| TE | 0.5 | 0.5 | 0.5 | 0.5 | 0.5 | 0.5 |
| NE | 500 | 500 | 500 | 500 | 500 | 500 |
| Suite 2: Long WT SR Suite | | | | | | |
| IE | 0.0 | 0.0 | 0.0 | 0.0 | 0.0 | NA |
| WT | 10,000 | 10,000 | 10,000 | 10,000 | 10,000 | 10,000 |
| RT | 1 | $\sqrt{10}$ | 10 | $\sqrt{100}$ | 100 | NA |
| TE | 0.5 | 0.5 | 0.5 | 0.5 | 0.5 | 0.5 |
| NE | 500 | 500 | 500 | 500 | 500 | 500 |
| Suite 3: Optimal WT IR Suite | | | | | | |
| IE | 0.8 | 0.8 | 0.8 | 0.8 | 0.8 | NA |
| WT | 10 | $\sqrt{100}$ | 100 | $\sqrt{1,000}$ | $\sqrt{10,000}$ | 10,000 |
| RT | 1 | $\sqrt{10}$ | 10 | $\sqrt{100}$ | 100 | NA |
| TE | 0.5 | 0.5 | 0.5 | 0.5 | 0.5 | 0.5 |
| NE | 500 | 500 | 500 | 500 | 500 | 500 |

*Parameter is not applicable, since this represents the normal CPMG sequence.
Note that RT = is used as a flag to describe a standard CPMG preceded by WT. All times are in milliseconds (ms). Each sequence was repeated only once with 500 echoes collected (NE = 500).

One pu of Gaussian noise was added to the experimental data. Then, 25 noise realizations were run for each suite. The data were then inverted using the nnls( ) function in MatLab™. This function provides an inversion with positivity constraint. The data were either inverted directly or with window sums. The window sums contained the following echoes: 1, 2–3, 4–6, 7–10, 11–16, 17–25, 26–39, 40–60, 61–91, 92–138, 139–208, 209–314, 315–500. The following tables show the results from the inversions (using "direct" or "window sums" (WS) approach):

| | $T_2$(ms) | | | |
|---|---|---|---|---|
| | Oil $T_{2,lm} = 6.89$ | | Water $T_{2,lm} = 6.89$ | |
| Suite | $T_{2\ lm}$ (direct) | $T_{2\ lm}$ (WS) | $T_{2\ lm}$ (direct) | $T_{2\ lm}$ (WS) |
| 1 | 7.3 ± 2.2 | — | 7.0 ± 1.5 | — |
| 2 | 7.3 ± 2.4 | — | 6.9 ± 1.2 | — |
| 3 | 6.5 ± 1.6 | — | 7.2 ± 1.0 | — |

| | Porosity | | | |
|---|---|---|---|---|
| | Oil $\phi = 0.10$ | | Water $\phi = 0.20$ | |
| Suite | $\phi$ (direct) | $\phi$ (WS) | $\phi$ (direct) | 100 (WS) |
| 1 | 0.11 ± 0.02 | 0.11 ± 0.01 | 0.20 ± 0.02 | 0.20 ± 0.02 |
| 2 | 0.11 ± 0.03 | 0.11 ± 0.03 | 0.20 ± 0.03 | 0.19 ± 0.03 |
| 3 | 0.10 ± 0.02 | 0.10 ± 0.01 | 0.20 ± 0.02 | 0.20 ± 0.02 |

"WS" indicates inversions performed with window sums.

These result show that the IR-CPMG suites (suites 1 and 3) provide better quality data than does the SR-CPMG suite (suite 2), as evidenced by the smaller standard deviations. As stated earlier, inversion recovery (IR) experiments monitor the growth of signals from 1 to +1, while the saturation recovery (SR) experiments monitor the growth of signals from 0 to +1 (see FIG. 6A). Thus, it is expected that the IR-CPMG suites would provide better quality data than would the SR-CPMG suite.

A comparison between results from suites 1 and 3 reveals that suite 3, which has optimized WT values, produces better results. This is probably due to the spread of WT values that provide more accurate fitting of data to the model. This is so because the amplitude of each echo includes the term $$S=1+IE^*(1-e^{-WT/T1}).$$

which can be better fitted with WT values spanning the $T_1$ value (i.e., from $WT<T_1$ to $WT>T_1$), as compared with a single WT value in suite 1. In addition, the parameters in suite 3 permit faster signal acquisition (than suites 1 and 2). The faster acquisition will allow more signal averaging/stacking within the same period of time, hence better signal-to-noise ratio (SNR).

The above simulation has assumed a $T_1/T_2$ ratio of 1.0 for oils and a $T_1/T_2$ ratio of 1.5 for water. To investigate the effects of $T_1/T_2$ ratio mismatch on the results, simulations were run with various $T_1/T_2$ (water) ratios, ranging from 1.5 to 2.4 in steps of 0.1. The same $T_2$ distributions for oil and water were used. For each ratio, 100 noise realizations were averaged. Results for porosities and $T_{2lm}$ are shown in FIGS. 7A and 7B, respectively.

Figure 7A:
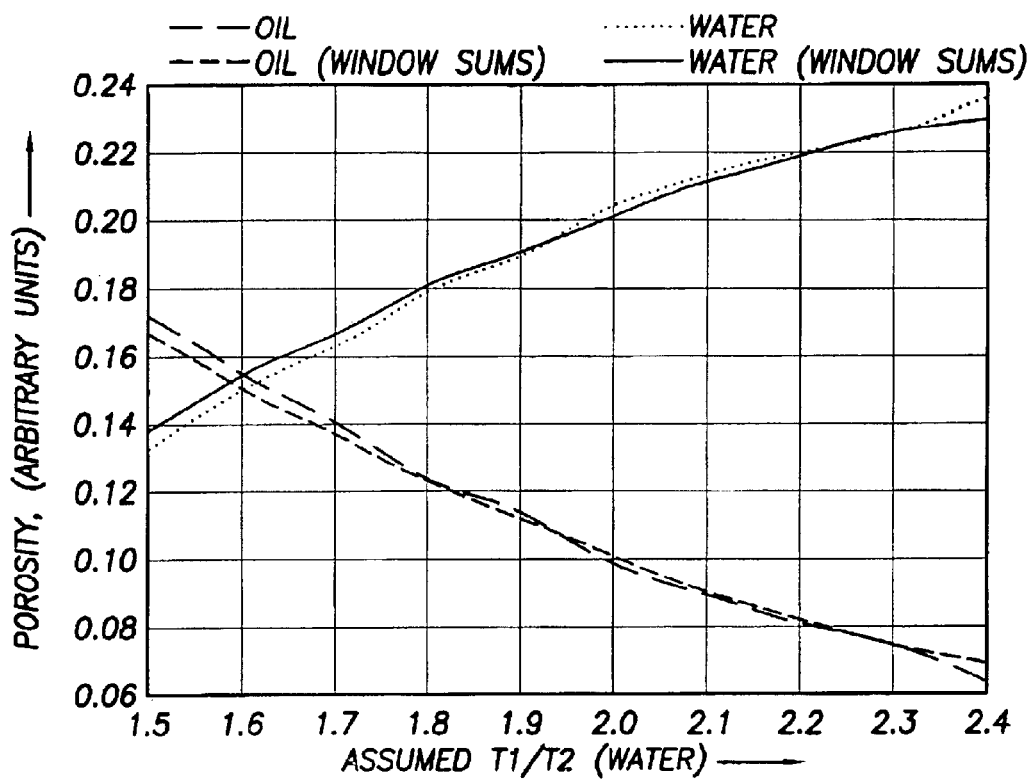
FIGS. 7A and 7B show the results of computed porosity and $T_{2lm}$, respectively, versus connate water $T_1/T_2$ values.
Figure 7B:
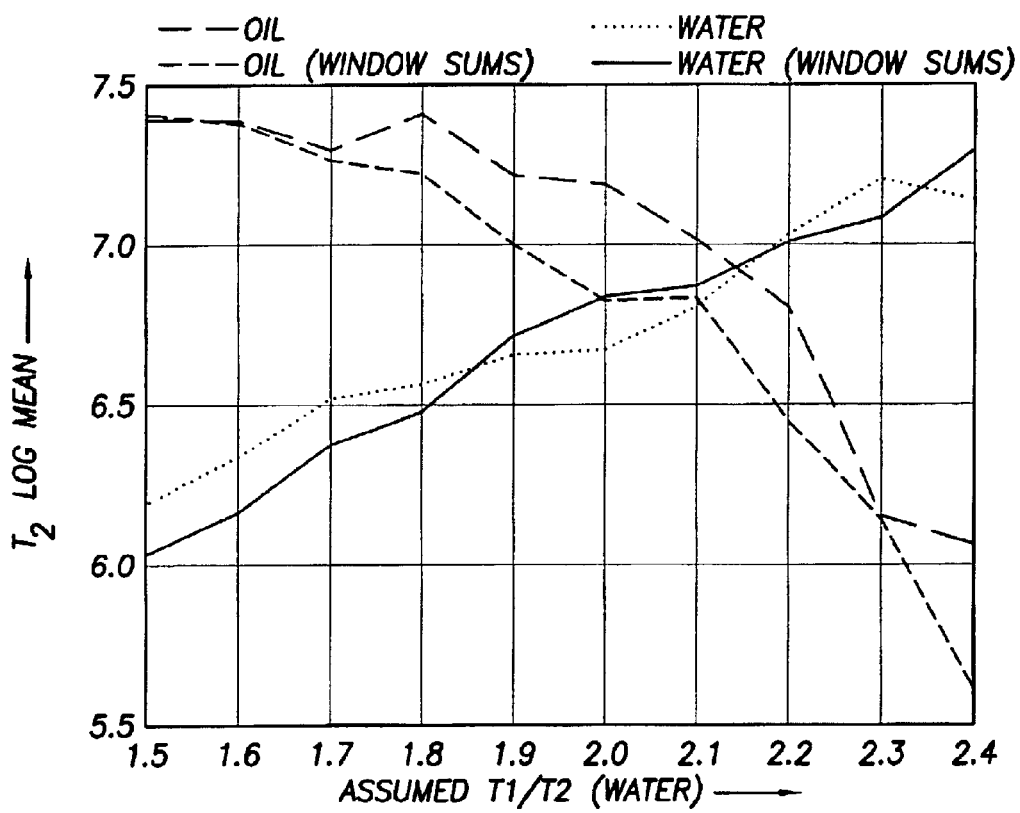

As shown in FIG. 7A, the porosity results are relatively sensitive to the $T_1/T_2$ ratio. A change of $T_1/T_2$ from 1.5 to 2.4 resulted in an about 2-fold change in the porosities. In contrast, FIG. 7B shows that $T_{2lm}$ is less sensitive to $T_1/T_2$ changes. A change of $T_1/T_2$ from 1.5 to 2.4 resulted in less than 40% changes in the $T_{2lm}$ values.

Because the results depend very sensitively on the $T_1/T_2$ ratio, this quantity needs either to be known a priori or it needs to be determined out of the data set as well. In principle, the data fit should be best for the correct $T_1/T_2$ ratio, i.e., the error function (square sum of misfit between measurements and reconstruction) should be at a minimum for this value. In case of a linear model, this function can be written as: $f=\Sigma$ (mdata(M×spec))$^2$, where mdata are the measurements, M describes the linear model, spec is the vector of model parameters, and M×spec describes the reconstructed NMR data based on the model. The summation goes over all measured data.

Figure 8:
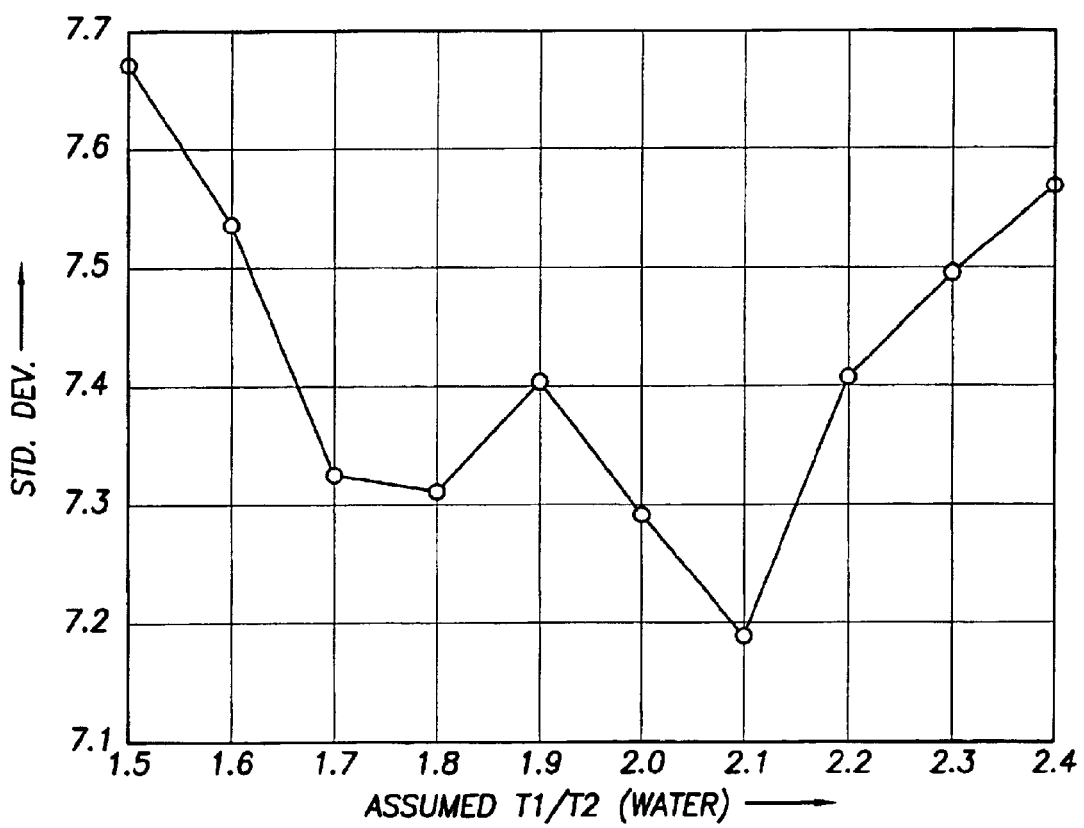
FIG. 8 shows a graph of quality of model fit to experimental data as a function of $T_1/T_2$ ratios.

FIG. 8 shows that there is, indeed, such a minimum that can be used to fix the $T_1/T_2$ ratio of water. The results in FIG. 8 are obtained with inversion of the window sums as described above. As can be seen from this inversion (which is averaged over 100 noise realizations), the minimum is very flat and thus not well defined. However, such minimum may be better defined by averaging over large intervals with similar lithology (i.e., similar surface relaxivity).

Instead of using a common $T_1/T_2$ ratio for each fluid averaged over a large depth interval as illustrated above, it is also possible to determine the $T_1/T_2$ ratio for each depth level in the inversion using a non-linear fit routine, e.g., the inversion method of Freedman (G.B. Pat. No. 2,338,068 or U.S. Pat. No. 6,229,308B1) or the above cited non-linear optimization routine by Powell. However the weak dependence of the IR-CPMG data suite on the $T_1/T_2$ ratio makes the accuracy of the determined value questionable. Thus, the inversion using the $T_1/T_2$ ratio for each depth level may not be more accurate than that using a common $T_1/T_2$ ratio.

The above discussion presumes a homogeneous field. In an inhomogeneous field, the echo train decay constant may have contributions from both $T_1$ and $T_2$, and these contributions may change with the echo number. Thus, the effective $T_1/T_2$ ratio for water might be echo number dependent for logging tools. In addition, it is assumed that the $T_1/T_2$ ratio is constant for each fluid. For $T_2$ values in the BFV (bound fluid volume) region, the $T_1/T_2$ ratio is probably constant. However, this may not be true for all fluids. For example, for water in large vugs, surface relaxation will be unimportant and thus the ratio will approach 1.0. If this situation is suspected, it is advisable to use other types of measurements to confirm the results. In addition, if the $T_1/T_2$ ratio changes with $T_2$, the function should be known or be determined. This function could be determined from cores or from analysis of a similar non-reservoir interval (without oil).

Advantages of the present invention include its applicability to spins with short $T_1$ or $T_2$, where diffusion-based approach fails. In addition, with short $T_1$ and $T_2$, the IR-CPMG sequence may be repeated quickly to gather good SNR data in a relatively short period of time. Furthermore, the invention is not limited by the types of NMR tools used for acquisition; it is applicable to a wireline NMR tool, a formation tester having an NMR module, or an LWD NMR tool. In addition, methods of the invention may be applied to NMR measurements obtained in a laboratory using a fluid sample, which may be any mixture of fluids whether formation fluids or not.

The above discussion uses the $T_1/T_2$ contrast as a parameter in the MRF method to separate fluids. Other parameters may be used in combination. For example, diffusion contrast may be used together with the $T_1/T_2$ contrast. These information may be included in one data set and simultaneously inverted for optimal $$SNR/\sqrt{t}$$

for the answer products. If the diffusion is not taken into account, the echo spacing preferably should be short so that diffusion is negligible and the decay constant is the diffusion-free $T_2$ value.

While the invention has been described with respect to a limited number of embodiments, those skilled in the art, having benefit of this disclosure, will appreciate that other embodiments can be devised without departing from the scope of the invention as disclosed herein. Accordingly, the scope of the invention should be limited only by the attached claims.

What is claimed is:

1. A method for determining properties of a mixture of fluids, comprising:
   (a) acquiring a plurality of nuclear magnetic resonance measurements from the mixture of fluids, each of the plurality of nuclear magnetic resonance measurements having a different value in an acquisition parameter for which at least one relaxation selected from the group consisting of longitudinal relaxation and transverse relaxation affects magnitudes of the nuclear magnetic resonance measurements;
   (b) generating a model of the mixture of fluids;
   (c) calculating a synthesized nuclear magnetic data set based on model;
   (d) comparing the synthesized nuclear magnetic data set with the nuclear magnetic resonance measurements; and
   (e) adjusting the model and repeating (c) and (d), if difference between the synthesized nuclear magnetic data set and the nuclear magnetic measurements is greater than a minimum.

2. The method of claim 1, wherein the mixture of fluids comprise formation fluids.

3. The method of claim 2, wherein the formation fluids is an earth formation.

4. The method of claim 3, further comprising (f) deriving, from the model, at least one porosity selected from the group consisting of water-filled porosity, oil-filled porosity, total NMR porosity, free-fluid porosity, and bound-fluid porosity of the earth formation.

5. The method of claim 3, further comprising (f) deriving, from the model, at least one saturation from the group consisting of water saturation and oil saturation of the earth formation.

6. The method of claim 3, further comprising (f) deriving, from the model, viscosities or diffusion constants of oil constituents of the earth formation.

7. The method of claim 2, wherein the formation fluids are removed from an earth formation using a formation tester.

8. The method of claim 2, wherein the formation fluids is in a core sample from an earth formation.

9. The method of claim 2, wherein the model comprises least one component for a connate water phase and at least one component for an oil phase.

10. The method of claim 9, wherein the model comprises a set of amplitude components that define transverse relaxation time distribution of the connate water phase and a set of amplitude components that define transverse relaxation time distribution of the oil phase.

11. The method of claim 9, wherein the model further comprises one selected from the group consisting of an oil-based mud filtrate component and a gas component.

12. The method of claim 1, wherein the acquiring uses a pulse sequence comprising an inversion recovery sequence and a Carr-Purcell-Meiboom-Gill sequence.

13. The method of claim 12, wherein the acquisition parameter comprises one selected from the group consisting of a recovery time RT in the inversion recovery sequence, a polarization time WT, and an inter-echo delay TE in the Carr-Purcell-Meiboom-Gill sequence.

14. The method of claim 12, wherein the model comprises a correlation function for each component in the mixture of fluids, the correlation function relates a measured magnitude, $A_i$, of the nuclear magnetic measurements with parameters used for the acquiring as follows:

$$A_i = A(1 - S^* e^{-RT/T_1}) e^{-iTE/T_1}$$

where A is a full signal amplitude after full polarization along the static magnetic field, RT is an inversion recovery time in the inversion recovery sequence, TE is an inter-echo delay time in the Carr-Purcell-Meiboom-Gill sequence, $T_1$ is a longitudinal relaxation time, $T_2$ is a transverse relaxation time, and S is define as:

$$S = 1 + IE^*(1 - e^{-WT/T_1}).$$

where IE is an inversion efficiency and WT is a polarization time.

15. The method of claim 1, wherein the acquiring uses a pulse sequence comprising a saturation recovery sequence and a Carr-Purcell-Meiboom-Gill sequence.

16. The method of claim 15, wherein the acquisition parameter comprises one selected from the group consisting of a recovery time RT in the inversion recovery sequence, a polarization time WT, and an inter-echo delay TE in the Carr-Purcell-Meiboom-Gill sequence.

17. The method of claim 1, wherein the acquiring comprises: inducing a static magnetic field in a region of investigation; generating a series of radio frequency magnetic field pulses in the region of investigation, the series of radio frequency magnetic field pulses comprise an inversion recovery pulse sequence and a Carr-Purcell-Meiboom-Gill pulse sequence; and receiving signals comprising a train of nuclear magnetic resonance spin echoes, wherein a polarization time between the series of radio frequency magnetic field pulses is WT, an inter-echo delay the Carr-Purcell-Meiboom-Gill pulse sequence is TE, a recovery time in the inversion recovery pulse sequence is RT, and the generating and the receiving are repeated a plurality of times each with a different value in at least one parameter selected from the group consisting of WT, TE, and RT.

18. The method of claim 1, wherein the acquiring comprises: inducing a static magnetic field in a region of investigation; generating a series of radio frequency magnetic field pulses in the region of investigation, the series of radio frequency magnetic field pulses comprise a satuation recovery pulse sequence and a Carr-Purcell-Meiboom-Gill pulse sequence; and receiving signals comprising a train of nuclear magnetic resonance spin echoes, wherein a polarization time between the series of radio frequency magnetic field pulses is WT, an inter-echo delay in the Carr-Purcell-Meiboom-Gill pulse sequence is TE, a recovery time in the saturation recovery pulse sequence is RT, and the generating and the receiving are repeated a plurality of times each with a different value in at least one parameter selected from the group consisting of WT, TE, and RT.

19. A method for logging an earth formation surrounding a wellbore, comprising:

(a) lowering a nuclear magnetic resonance instrument into the wellbore;

(b) inducing a static magnetic field in a region of investigation;

(c) generating a series of radio frequency magnetic field pulses in the region of investigation, and receiving signals comprising a train of nuclear magnetic resonance spin echoes in response to the series of radio frequency magnetic field pulses, wherein the generating and the receiving are repeated a plurality of times each with a different value in an acquisition parameter for which at least one of the longitudinal relaxation and transverse relaxation affects magnitudes of the signals;

(d) generating a formation model that includes at least one component for a connate water phase and at least one component for an oil phase, wherein the formation model comprises a set of amplitude components that define transverse relaxation time distribution of the connate water phase and a set of amplitude components that define transverse relaxation time distribution of the oil phase;

(e) calculating a synthesized nuclear magnetic data set based on the formation model;

(f) comparing the synthesized nuclear magnetic data set with the nuclear magnetic resonance measurements; and (g) adjusting the formation model and repeating (c) and (d), if difference between the synthesized nuclear magnetic data set and the nuclear magnetic measurements is greater than a minimum.

20. The method of claim 19, wherein the series of radio frequency magnetic field pulses comprise an inversion recovery sequence and a Carr-Purcell-Meiboom-Gill sequence.

21. The method of claim 19, wherein the series of radio frequency magnetic field pulses comprise a saturation recovery sequence and a Carr-Purcell-Meiboom-Gill sequence.

22. The method of claim 19, wherein the formation model further comprises one selected from the group consisting of an oil-based mud filtrate component and a gas component.

23. The method of claim 19, further comprising (h) deriving, from the formation model, at least one porosity selected from the group consisting of water-filled porosity, oil-filled porosity, total NMR porosity, free-fluid porosity, and bound-fluid porosity of the formations.

24. The method of claim 19, further comprising (h) deriving, from the formation model, at least one saturation selected from the group consisting of water saturation and oil saturation of the formations.

25. The method of claim 19, further comprising (h) deriving, from the formation model, viscosities or diffusion constants of oil constituents of the formations.

* * * * *